(12) United States Patent
Matos

(10) Patent No.: US 9,504,356 B2
(45) Date of Patent: Nov. 29, 2016

(54) FRY BASKET

(71) Applicant: Pronto Products Co., Arcadia, CA (US)

(72) Inventor: Carlos Matos, Redondo Beach, CA (US)

(73) Assignee: PRONTO PRODUCTS CO., Arcadia, CA (US)

( * ) Notice: Subject to any disclaimer, the term of this patent is extended or adjusted under 35 U.S.C. 154(b) by 83 days.

(21) Appl. No.: 14/076,066

(22) Filed: Nov. 8, 2013

(65) Prior Publication Data

US 2014/0060340 A1 Mar. 6, 2014

Related U.S. Application Data

(63) Continuation-in-part of application No. 13/970,561, filed on Aug. 19, 2013, now abandoned.

(60) Provisional application No. 61/684,597, filed on Aug. 17, 2012, provisional application No. 61/708,972, filed on Oct. 2, 2012.

(51) Int. Cl.
*A47J 37/12* (2006.01)

(52) U.S. Cl.
CPC .................. *A47J 37/1295* (2013.01)

(58) Field of Classification Search
CPC ...... A47J 37/1295; A47J 37/12; A47J 29/04; A47J 37/1219; A47J 37/1228; A47J 27/0817; G07F 17/0078
USPC .......... 426/438, 509, 523; 99/336, 403, 408, 99/411
See application file for complete search history.

(56) References Cited

U.S. PATENT DOCUMENTS

| | | | |
|---|---|---|---|
| 2,593,392 A | 4/1952 | Budlane et al. | |
| 2,658,444 A | 11/1953 | Wheeler | |
| 2,740,349 A * | 4/1956 | De Gonia | 99/426 |
| 3,071,064 A | 1/1963 | Horvath | |
| D197,322 S | 1/1964 | Wilt | |
| 3,217,633 A | 11/1965 | Anetsberger | |
| 3,242,849 A | 3/1966 | Wells | |
| 3,331,309 A | 7/1967 | Proffitt | |
| 3,525,299 A | 8/1970 | Gouwens | |
| 3,613,553 A | 10/1971 | Popeil | |
| D236,414 S | 8/1975 | Kroll | |
| 3,960,137 A | 6/1976 | Schmid | |
| D242,947 S | 1/1977 | Graham | |
| 4,006,675 A * | 2/1977 | Lill | 99/417 |
| 4,321,859 A | 3/1982 | Rimmeir | |
| 4,508,027 A | 4/1985 | McCord | |
| 4,542,684 A | 9/1985 | Cantrell | |
| 4,542,685 A | 9/1985 | Wilson | |
| 4,704,290 A | 11/1987 | Fritzsche | |
| 4,854,227 A | 8/1989 | Koopman | |
| D304,991 S | 12/1989 | Roberge | |
| 5,079,020 A | 1/1992 | Koopman et al. | |
| 5,385,084 A | 1/1995 | Laibson | |

(Continued)

OTHER PUBLICATIONS

Pronto Products Co. product catalog; 2010; 27 pgs.

*Primary Examiner* — Tu B Hoang
*Assistant Examiner* — Thomas Ward
(74) *Attorney, Agent, or Firm* — Michael F. Fedrick; Loza & Loza, LLP

(57) ABSTRACT

A fry basket including a frame for supporting individual inserts for receiving food items and a locking bar for retaining the inserts within the frame.

16 Claims, 14 Drawing Sheets

(56) References Cited

U.S. PATENT DOCUMENTS

| | | |
|---|---|---|
| 5,544,567 A | 8/1996 | Davis et al. |
| 5,811,740 A | 9/1998 | Hamilton, Sr. |
| 5,992,306 A | 11/1999 | Chiang |
| 6,176,175 B1 * | 1/2001 | Moreth ............ 99/408 |
| D453,027 S | 1/2002 | Andujar |
| 6,386,094 B1 | 5/2002 | Stevenson et al. |
| 6,398,066 B1 | 6/2002 | Mullins |
| 6,591,741 B1 | 7/2003 | Martin |
| 6,868,776 B2 | 3/2005 | Stevenson et al. |
| D563,163 S | 3/2008 | Blouw et al. |
| 7,341,162 B2 | 3/2008 | Svabek et al. |
| 7,383,963 B2 | 6/2008 | Svabek et al. |
| 7,500,427 B2 | 3/2009 | Rosenzweig |
| 7,543,530 B2 | 6/2009 | Cohn et al. |
| 7,775,156 B2 | 8/2010 | Sus et al. |
| D635,363 S | 4/2011 | Hertaus |
| 8,037,812 B1 | 10/2011 | Sumner, Sr. |
| 8,133,520 B2 | 3/2012 | Feinberg et al. |
| 8,342,081 B2 | 1/2013 | Cohn et al. |
| 2002/0017198 A1 * | 2/2002 | Gauthier et al. ............ 99/330 |
| 2005/0204929 A1 | 9/2005 | Rosenzweig |
| 2005/0268791 A1 * | 12/2005 | Svabek et al. ............ 99/330 |
| 2005/0269332 A1 | 12/2005 | Svabeck et al. |

* cited by examiner

FRY BASKET

CROSS-REFERENCE TO RELATED APPLICATIONS

This application claims the benefit of priority under 35 U.S.C. §120 to the following patent applications: U.S. patent application Ser. No. 13/970,561, filed Aug. 19, 2013 and entitled FRY BASKET; U.S. patent application No. 61/684,597, filed Aug. 17, 2012 and entitled TACO SHELL FRY BASKET; and U.S. patent application No. 61/708,972, filed Oct. 2, 2012 and entitled FRY BASKET. The disclosures of the foregoing applications are incorporated herein by reference in their entirety.

BACKGROUND

Various food products can be cooked by immersion in a hot liquid, usually boiling water or hot oil. For example, tortillas can be deep fried in oil to produce a taco shell. In order to produce a taco shell, a fry basket can be used to form the tortilla into a desired shape and suspend it in oil during frying. Several tortillas can be fried at once using a fry basket having a compartment for each tortilla. Fry baskets are also used to deep fry a variety of other food products, including potatoes (French fries), fish, and chicken.

SUMMARY

The present invention comprises a basket for immersing food items in a cooking liquid, such as oil (for deep frying) or water (for boiling). The invention comprises a frame body (20) having:
  (i) a circumferential, preferably rectangular upper support structure (26) formed by a proximal frame rod (21), a distal frame rod (23), and a pair of lateral frame rods (22, 24) extending between the proximal frame rod and the distal frame rod, each lateral frame rod comprising a proximal end mechanically connected to and/or or integrally formed with the proximal frame rod and a distal end mechanically connected to and/or or integrally formed with the distal frame rod;
  (ii) a pair of lateral support rails (30) connected to the frame body mechanically connected to and extending between the proximal frame rod (21) and the distal frame rod (23), each of the lateral support rails (30) is disposed below the lateral frame rods (22, 24); and
  (iii) downwardly extending supports (70) attached to the frame body for supporting the frame above a support surface.

In a preferred embodiment, the lateral support rails are linear and parallel to each other, and are also preferably disposed parallel to the lateral frame rods. The frame body can also further include a proximal support bar (31) extending between the lateral support rails (30) at a proximal end of each of the lateral support rails and a distal support bar (33) extending between the lateral support rails (30) at a distal end of each of the lateral support rails. The support bars are preferably connected to the lateral support rails (30) as well as to the lateral frame rods (22, 24), such as by being mechanically connected to the undersides of the lateral frame rods.

The frame body is preferably formed from rigid metal wire. In this embodiment, the circumferential upper support structure can be made by integrally forming the proximal frame rod and the distal frame rod with the pair of lateral frame rods from a single piece of wire. The basket further preferably includes a rectangular lower support structure attached to the downwardly extending supports (70) and formed by four rods, in order to provide increased stability to the basket.

One feature of the present basket is the use of a pair of locking bars (40) to retain cooking inserts within the basket. Each locking bar comprises a locking bar rod (41) extending between the proximal frame rod and the distal frame rod which is hingedly connected to a respective lateral frame rod. Each locking bar can be rotated from an open position in which an insert (100) can be placed within the frame body (20) to a closed position in which the locking bar rod is positioned over at least the laterally extending structural member in order to retain the insert within the frame body. When the locking bar is in the open position, it is preferably disposed beneath the lateral frame rods.

The present basket preferably further includes a handle (60) attached to the frame body. The handle has a distal portion extending vertically above the main frame in order to allow a user to place the basket into a cooking liquid and remove the basket therefrom.

The present basket is designed to be used with one or more inserts (100) that are retained by the frame body, the inserts being sized to fit between the pair of lateral support rail. Each of the inserts includes a pair of lateral sides having an extending structural member (115), such as a rim, for supporting the insert within the frame body (20). The inserts are configured to retain one or more food items and include openings to allow a flow of cooking liquid therethrough. The inserts can be formed from a wire mesh, for example, or can comprises a perforated U-shaped sheet of metal (105) attached at an upper end to the laterally extending structural member.

FIGURES

DESCRIPTION

Definitions

Figure 1:
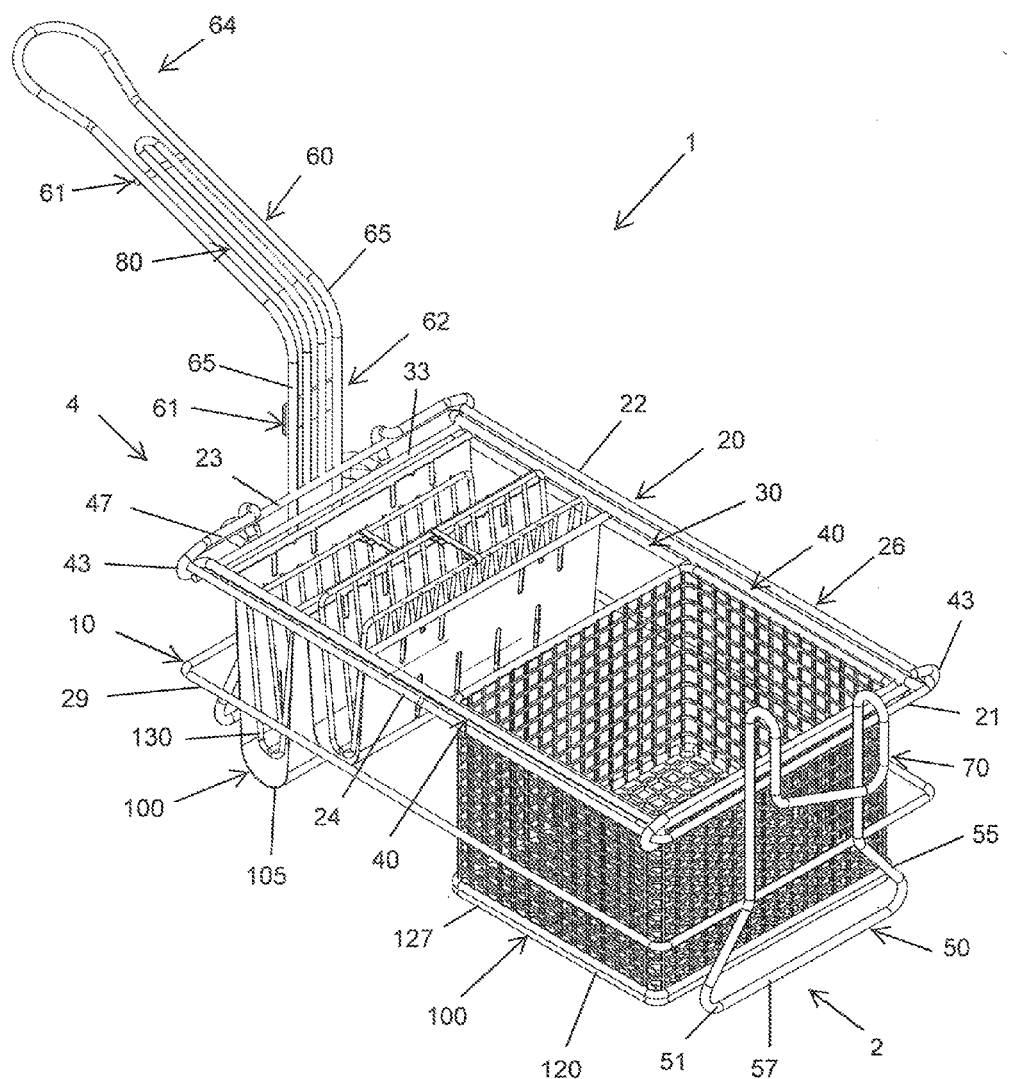
FIG. 1 is a perspective view of an embodiment of the present fry basket holding a deep frying basket insert and two taco shell inserts.

As used herein, the following terms and variations thereof have the meanings given below, unless a different meaning is clearly intended by the context in which such term is used.

"Below" refers to a relative position of a component of the present structure which is lower than another component.

"Downward" and "downwardly" mean in the direction of or toward a support surface on which the present apparatus is or can be positioned. "Upward" and "upwardly" mean in the opposite direction, i.e. away from such a support surface.

"Elongated" refers to a configuration or shape having a length which is longer than its width.

"Frame" refers to a rigid structural member used to enclose and/or support other structural components of the present fry basket.

"Hook" refers to a curved or angular rigid structure for holding or suspending the present device or a component thereof.

"Horizontal" refers to an orientation approximately parallel to (i.e., not substantially extending toward or away from) a support surface on which the present apparatus is supported when in use.

"Linear" means straight, i.e. extending or arranged in a line.

"Longitudinal" refers to a direction or shape along or parallel to the length of the present apparatus or a component thereof, i.e. along or parallel to the longer portion of the apparatus or component.

"Lower" refers to the relative position of a component in the present apparatus which is closer to or toward a support surface on which the present apparatus is positioned.

"Leg" refers to a generally vertically oriented or extending flange or structure for supporting the present fry basket or a component thereof on a support surface.

"Mechanically connected" means physically connected, either through a connection based on direct physical contact or via another mechanical structure. A mechanical connection can include the use of welding, fasteners, or other means of securing structures or components of the present device.

"Outward" and "outwardly" mean in a direction away from the horizontal or vertical center of the apparatus or of a component part of the apparatus.

"Rectangular" refers to a structure having four straight sides and four right angles, especially one in which two of the sides are longer than the remaining two parallel sides, although square forms are also included.

"Rod" refers to a structural member which has a longitudinal dimension greater than its width, preferably many times greater. Rods are preferably straight (without a bend, angle, or curve) over a greater portion of their length. In preferred methods of manufacturing the present fry basket, rods (e.g., metal wires) are bent in order to form the structural components of the fry basket.

"Rigid" refers to a structural element of the present basket which is able to maintain its shape in the course of the normal, intended use of the present fry basket, i.e. in holding and cooking food items during cooking, though some deformation (preferably elastic) is acceptable.

"Vertical" refers to an orientation extending toward or away from a support surface on which the present apparatus is supported or positioned when in use.

The terms "above," "below," "horizontal," and "vertical" refer to directions or positions with respect to a support surface on which the present device stands or is supported when the legs of the present device are placed on the support surface. Such terms are intended to be relative.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Fry Basket

As shown in the embodiment of FIGS. 1-4, the present fry basket 1 generally comprises a body 10 and inserts 100. The body 10 supports inserts 100 placed within its frame 20 so that the body and inserts can together be placed into a cooking liquid, generally heated oil (for frying) or water (for boiling). The inserts 100 retain selected food items to be cooked in such liquid. Although the present basket 1 is commonly used for deep frying and is therefore referred to as a fry basket, it can be used in other ways, such as for boiling food items. Any of a variety of food items can be deep fried, including tortillas, tacos, breaded fish, etc.

FIGS. 5-8 depict an embodiment of the body 10 of the present fry basket 1. In this embodiment, the body 10 can be constructed primarily from lengths of rigid metal wire which are bent and joined together in order to form the body 10. The wire is preferably either plain steel or stainless steel wire having a diameter of between 0.10 inches and 0.30 inches. Other metals or appropriate materials can also be used to form the present body 10 and its components, as long as such materials are suitable for contacting food (including frying oil), are able to withstand repeated heating and cooling, and are able to retain sufficient structural rigidity under normal use to hold and cook food items. During deep frying, the present fry basket is generally heated to between 300° F. and 500° F., though preferably to temperatures below 400° F.

Frame

In the embodiment of FIGS. 5-8, a frame 20 is formed from straight wire which is bent and welded at the ends to form a rectangular or square upper support structure 26 comprising a front (proximal) medial frame rod 21, a rear (distal) medial frame rod 23, and two lateral frame rods 22 and 24. The upper support structure 26 is sufficiently strong that it is able to support the weight of inserts 100 placed within the frame 20 in addition to any food items contained therein. Lateral frame rods 22 and 24 are preferably parallel, and the front medial frame rod 21 is likewise preferably parallel to rear medial frame rod 23.

Extending between front medial frame rod 21 and rear medial frame rod 23, and preferably located medially of each of the lateral frame rods 22 and 24, are lateral support rails 30. A first lateral support rail 32 is preferably disposed generally parallel to first lateral frame rod 22, and a second lateral support rail 34 is preferably disposed generally parallel to second lateral frame rod 24. The lateral support rails 32 and 34 are also preferably generally parallel to each other. The lateral support rails 32 and 34 accommodate and support the lateral rims, hooks or flanges of inserts 100, as explained below.

The lateral support rails 32 and 34 are mechanically connected to the lateral frame rods 22 and 24 and/or to the medial frame rods 21 and 23 of the frame 20. In the embodiment of FIGS. 5-8, the first lateral support rail 32 is attached for support to first lateral frame rod 22 at a position between the proximal end 222 and distal end 223 of the first lateral frame rod 22 by a lateral attachment bar 35, and the second lateral support rail 34 is likewise attached to second lateral frame rod 24 at a position between the proximal end 224 and distal end 225 of the second lateral frame rod 24 by a second lateral attachment bar 37 (see FIG. 7). When directly attaching metal components such as the lateral frame rod 22 and the lateral attachment bar 35 to each other, it is preferred that they be welded, such as by spot welding, although other attachment means are also possible.

The lateral support rails 32 and 34 are preferably further attached to the frame 20 by means of front (proximal) support bar 31 and rear (distal) support bar 33. The front support bar 31 is attached to the underside of the frame 20 at the proximal ends (223 and 225) of each of the lateral frame rods 22 and 24, generally parallel to the front medial rod 21, while rear support bar 33 is attached to the underside of the frame 20 at the distal ends (222 and 224) of each of the lateral frame rods 22 and 24, generally parallel to the rear medial rod 23. The respective ends of the lateral support rails 30 are each attached to one of the support bars 31 and 33, preferably on the underside of such support bar 31 and 33.

The lateral support rails 32 and 34 are preferably positioned medially with respect to the lateral frame rods 22 and 24 and preferably below or coplanar with the lateral frame rods in order to retain the inserts 100. The body of each insert 100 is sized so that the side walls 122 and 124 of the insert fits laterally between the lateral support rails 32 and 34, and so that the body of the insert 100 can be lowered into the fry basket 1 between the lateral support rails 32 and 34. As depicted in FIGS. 3 and 9-14, however, an upper portion 113 of the inserts 100 comprises a laterally extending structural member 115, such as a rim, flange, or hook, which extends laterally beyond the side walls 122 and 124 of the insert 100 on each lateral side (102, 104) of the insert 100. The lateral end of this rim or other structure 115 extends beyond at least a portion of a respective lateral support rail 30, such that the underside 119 of the rim 115 lies on top of (i.e., contacts the upper surface of) the respective lateral support rail 30. The lateral support rails 30 thus support the inserts 100 of the present fry basket 1 and retain the inserts 100 within the body 10 of the fry basket during use. Preferably, a lower portion 117 of the insert 100 extends downwardly no farther than the lower end 54 of the legs 50 when retained in the fry basket so that the legs 50 can support the insert 100 on or above a support surface.

In the embodiment shown in FIGS. 1-8, a rectangular lower support structure 29 is provided to add further stability to the fry basket 1. This support structure 29 comprises a circumferential, horizontal frame attached to each of the legs 50 of the fry basket 1.

Locking Bars

An important feature of the present fry basket 1 is the use of a locking bar 40 to retain the inserts 100 within the body 10 of the fry basket 1. A locking bar 40 is present on each lateral side of the body 10 and comprises at least a hinge 43 and a laterally extending rod or flange which extends from or near the front end 2 of the fry basket to the rear end 4. The locking bar 40 can for example comprise a locking bar rod 41, such as locking bar rods 42 and 44. Each locking bar rod 41 is hingedly connected to the body 10 so that the locking bar 40 can be rotated from an open position, in which inserts 100 can be placed within the frame 20, to a closed position, in which each locking bar rod 41 is positioned over at least a lateral portion of each lateral side of each insert 100, in particular over the laterally extending structural members 115, in order to retain the insert 100 within the frame 20. Preferably, each of the locking bar rods 41 contacts an upper surface of a laterally extending structural member 115 of each insert 100 when in the closed position in order to securely retain the insert 100 within the present fry basket 1 when in use.

In the embodiment of the present fry basket depicted in the figures, the locking bars 40 are formed from wire in the same manner as the frame 20. In this embodiment, the locking bar 40 comprises a locking bar rod 41 attached to a respective lateral frame rod (22 or 24) at the proximal end (222 or 224, respectively) and distal end (223 or 225, respectively) with a pair of hinges 43. In this embodiment, the hinge 43 comprises a loop of wire surrounding at least a portion of the frame rod (22 or 24) to which it is attached in order to retain the locking bar 40 on the frame rod.

Figure 5:
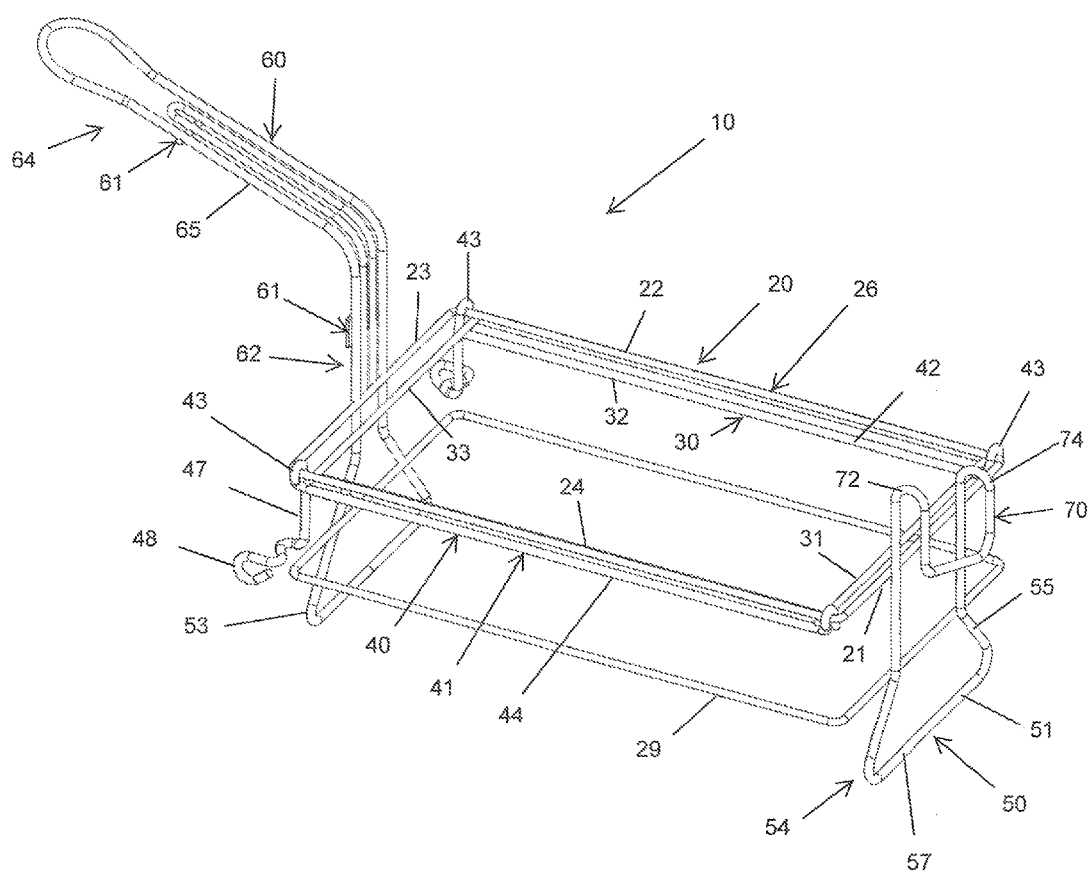
FIG. 5 is a perspective view of the fry basket body of FIG. 1.
Figure 6:
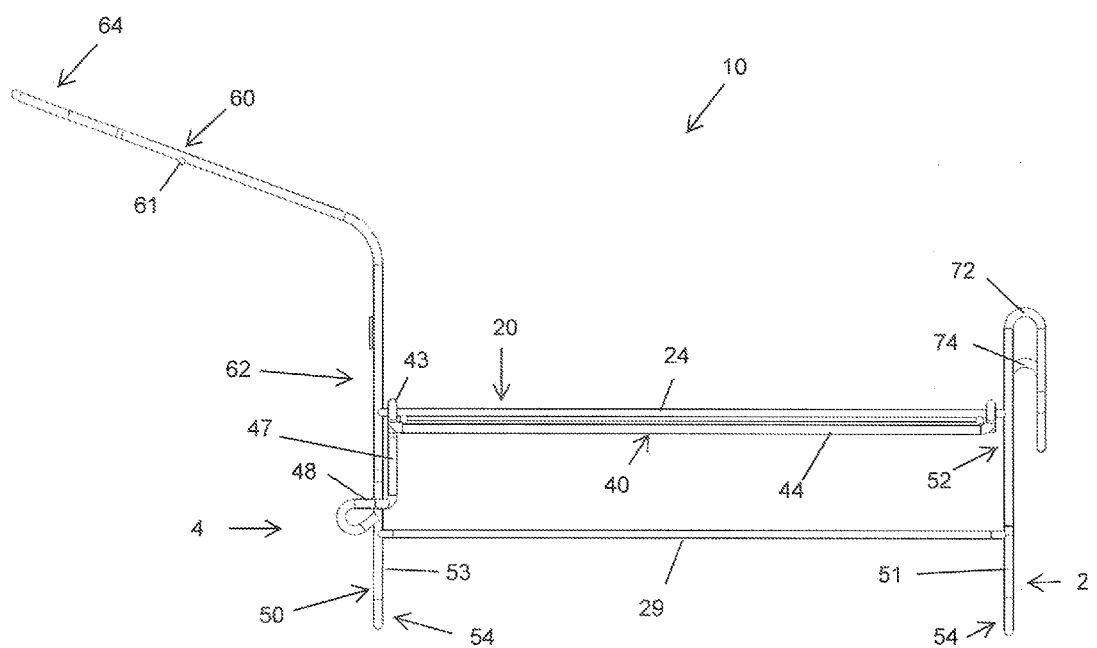
FIG. 6 is a side elevation view of the fry basket body of FIG. 5.
Figure 7:
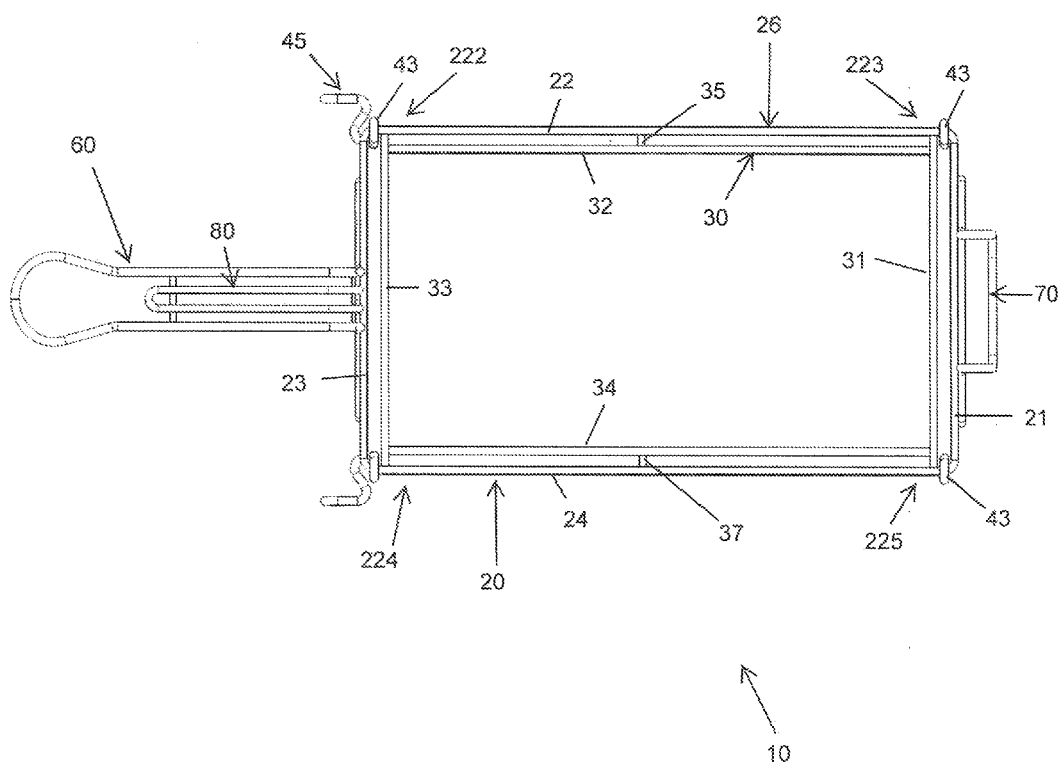
FIG. 7 is a top plan view of the fry basket body of FIG. 5.
Figure 8:
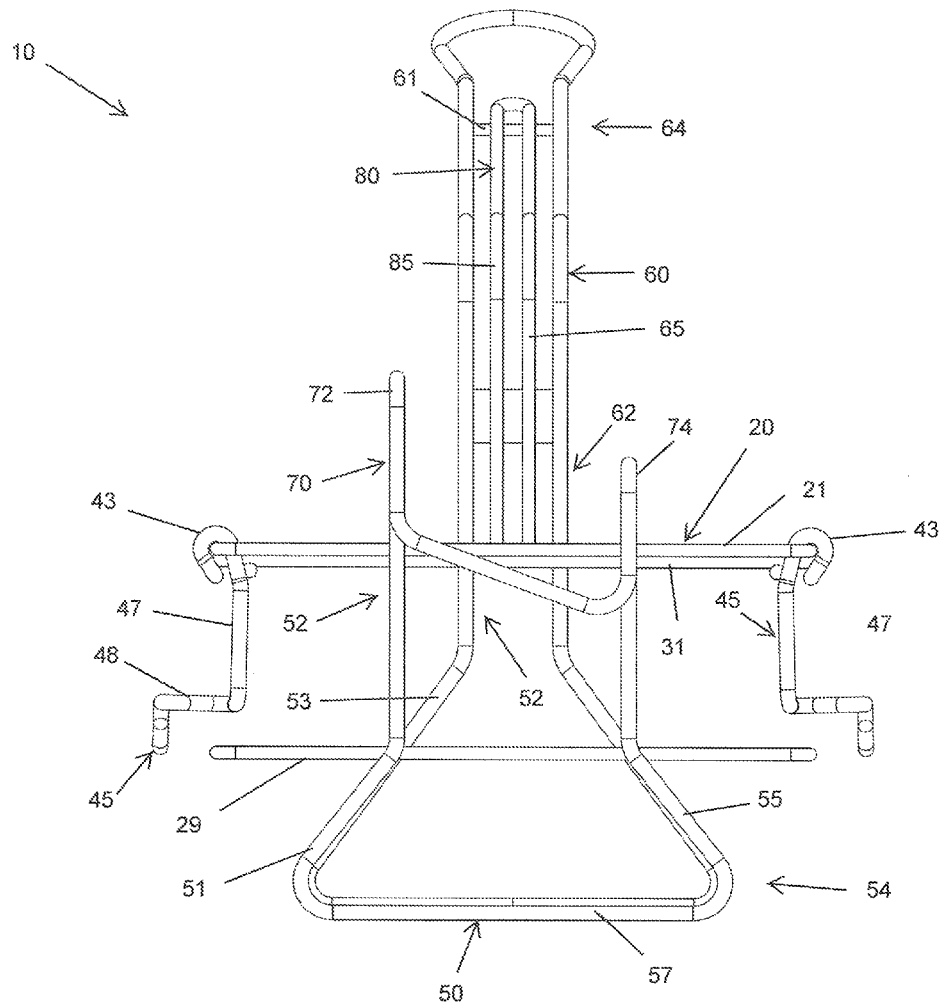
FIG. 8 is a front elevation view of the fry basket body of FIG. 5.
Figure 9:
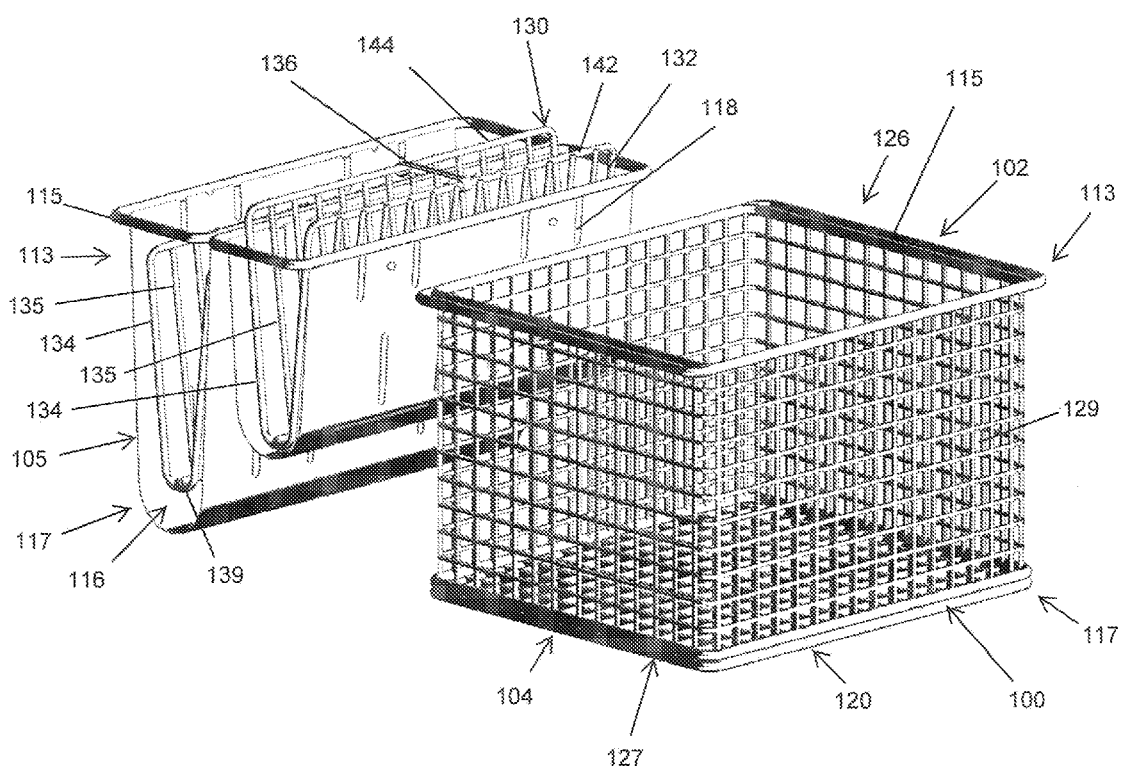
FIG. 9 is a perspective view of the deep frying basket insert and two taco shell inserts shown in FIG. 1.
Figure 10:
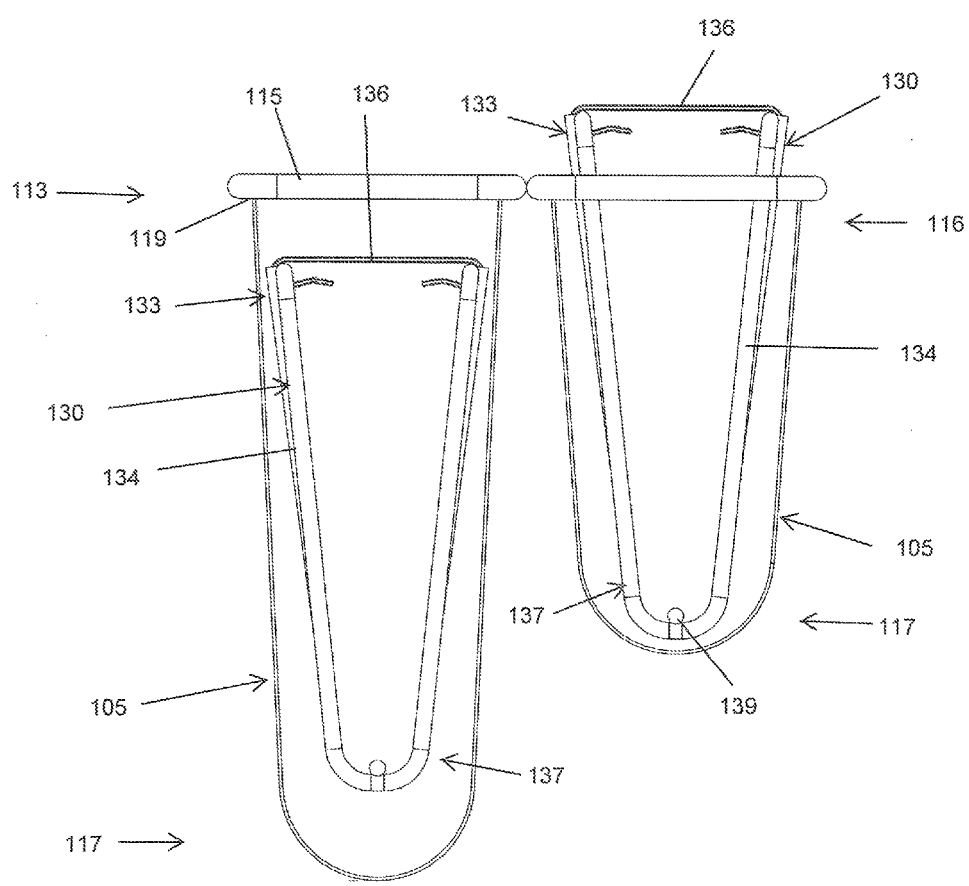
FIG. 10 is a side elevation view of the two taco shell inserts of FIG. 9.
Figure 11:
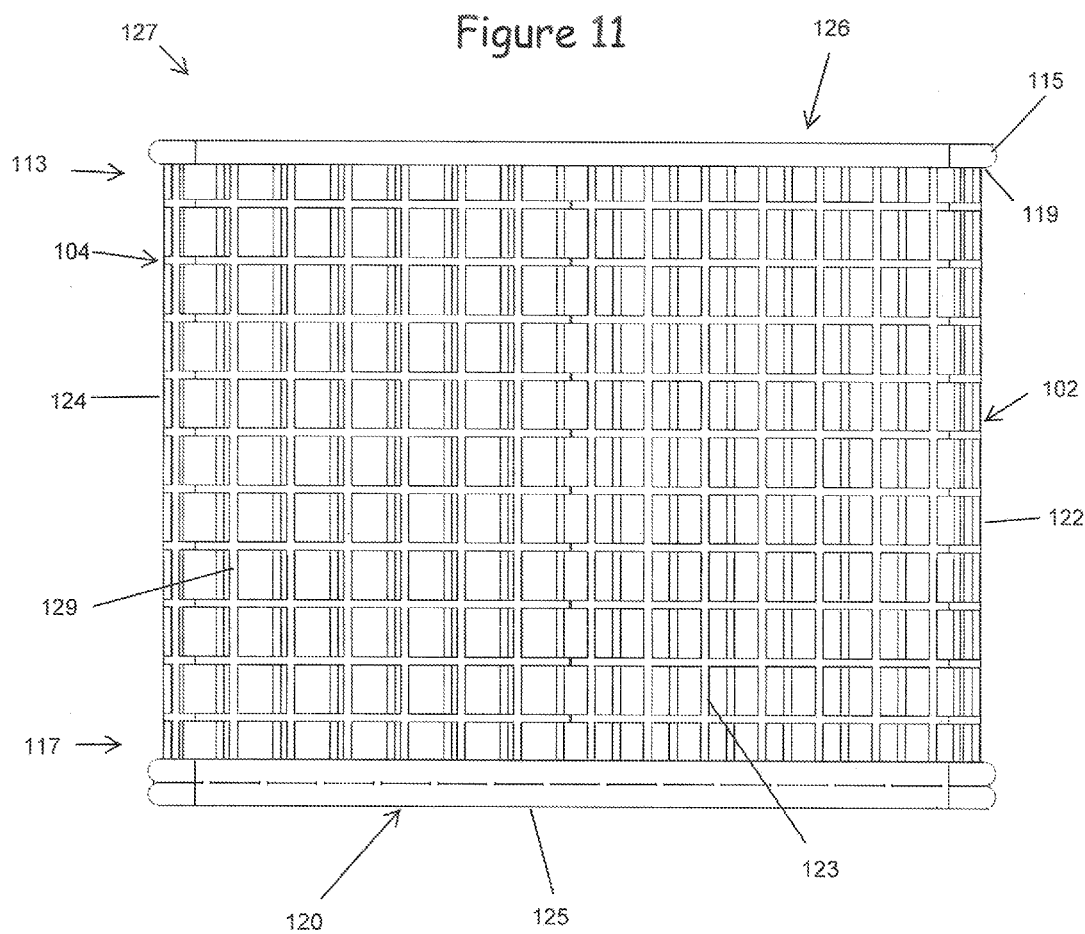
FIG. 11 is a side elevation view of the deep frying basket insert of FIG. 9.
Figure 12:
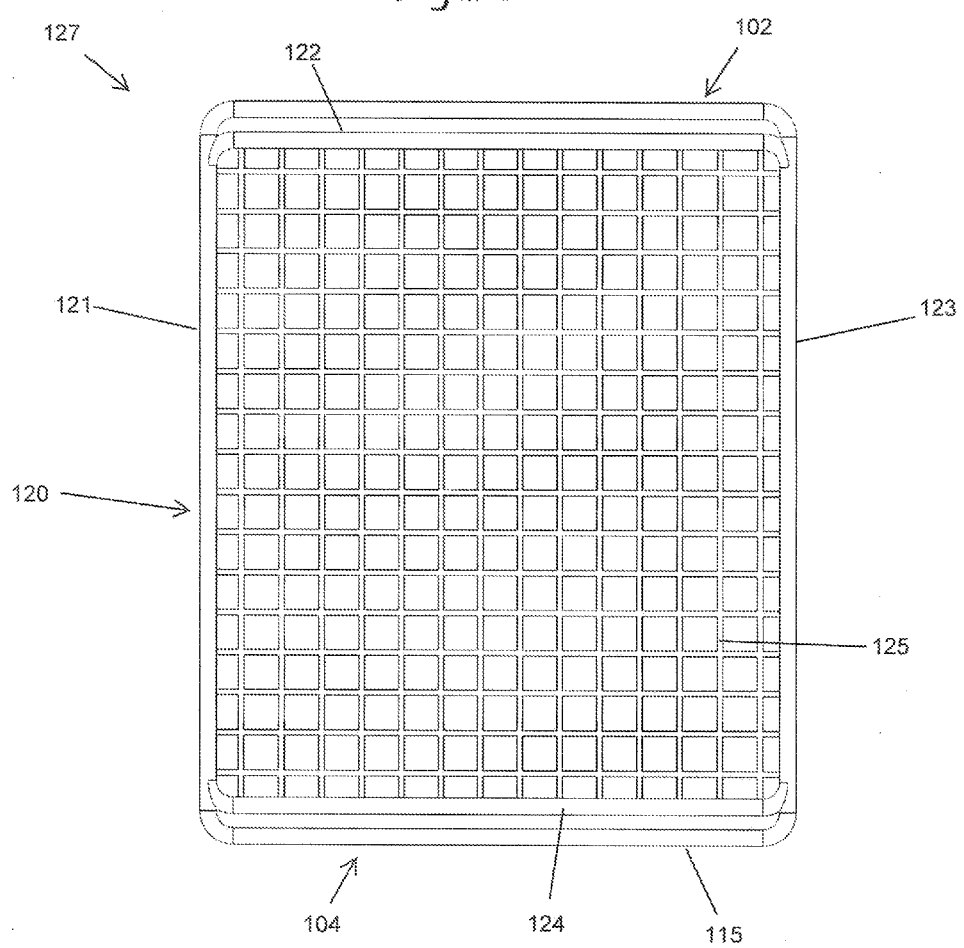
FIG. 12 is a top plan view of the deep frying basket insert of FIG. 9.
Figure 13:
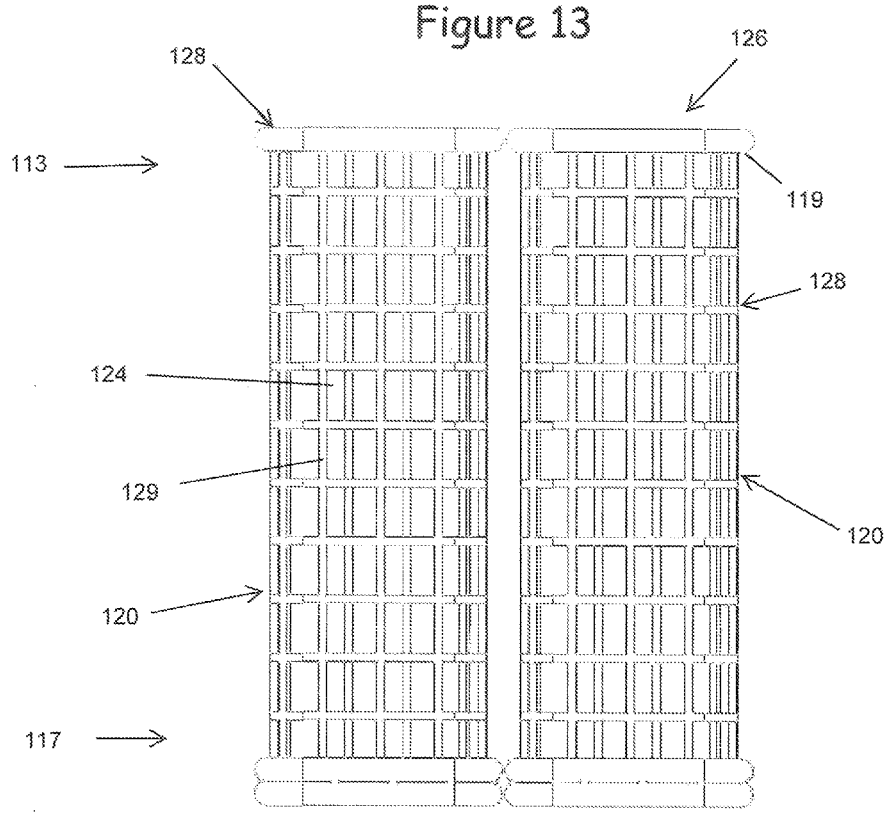
FIG. 13 is a side elevation view of the two smaller volume deep frying basket inserts shown in FIG. 3.

FIGS. 5, 6 and 8 illustrate the locking bars 40 in the open position. In this position, the respective locking bar rods 41 are rotated horizontally outward with respect to the frame 20 until each of the locking bar rods 41 is positioned laterally with respect to the frame rods. In these figures the locking bar rods 41 have been rotated so as to be positioned beneath the frame rods. In the open position, the inserts 100 can be lowered into the body 10 of the fry basket 1 until a lateral portion on each lateral side of the inserts rests on a lateral support rail 30.

In order to ensure that the inserts 100 remain in the body 10 of the fry basket during use, the locking bars 40 can be rotated in the opposite direction, in this case inwardly, such as with locking bar handles 45, so as to position the locking bar rods 41 directly over a lateral portion of each lateral side of the inserts 100. FIGS. 1-4 show the locking bar 40 in the locked position. In the illustrated embodiments, the locking bar 40 is secured in the closed position by rotating a laterally extending handle portion 47 inwardly until a locking handle portion 48 of the locking bar 40 contacts rear medial rod 23. The locking handle portion 48 then preferably elastically deforms as the locking bar 40 is further rotated in an inward direction until the locking bar 40 reaches a fully closed position, at which point the size and shape of the locking handle portion 48 allows it to resume an undeformed or less deformed configuration, thereby holding the locking bar 40 in the closed position. To open the locking bar 40, the handle 45 is rotated outwardly and the foregoing sequence of steps is reversed.

The use of a locking bar and removable inserts provides a number of advantages to the present fry basket. In current fry baskets, the forms or mesh portions that contact food and are placed in hot oil are welded or otherwise permanently secured to the fry basket. Over time, contact with oil and food items results in degradation of this portion of the basket and/or a build-up of unwanted deposits. This results in a need to eventually replace the entire fry basket. With the present fry basket, only the inserts 100, which are the food-contacting portions of the present fry basket and have the most contact with hot oil, can be replaced, allowing the frame 20 and other structural components of the fry basket 1 to continue being used.

Figure 2:
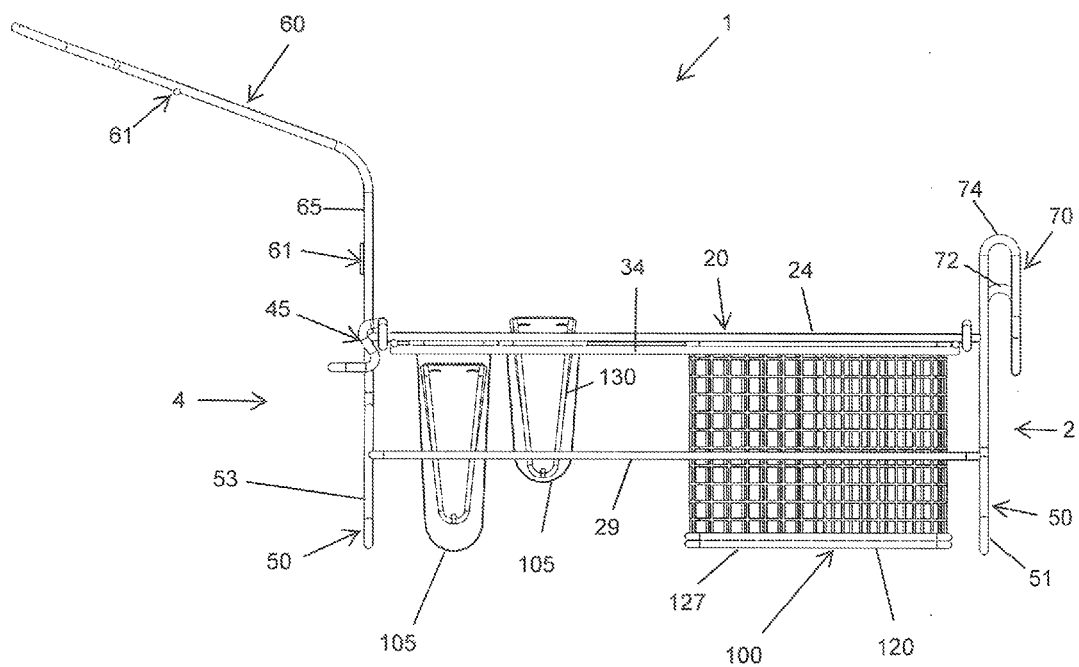
FIG. 2 is a side elevation view of the embodiment of FIG. 1.
Figure 3:
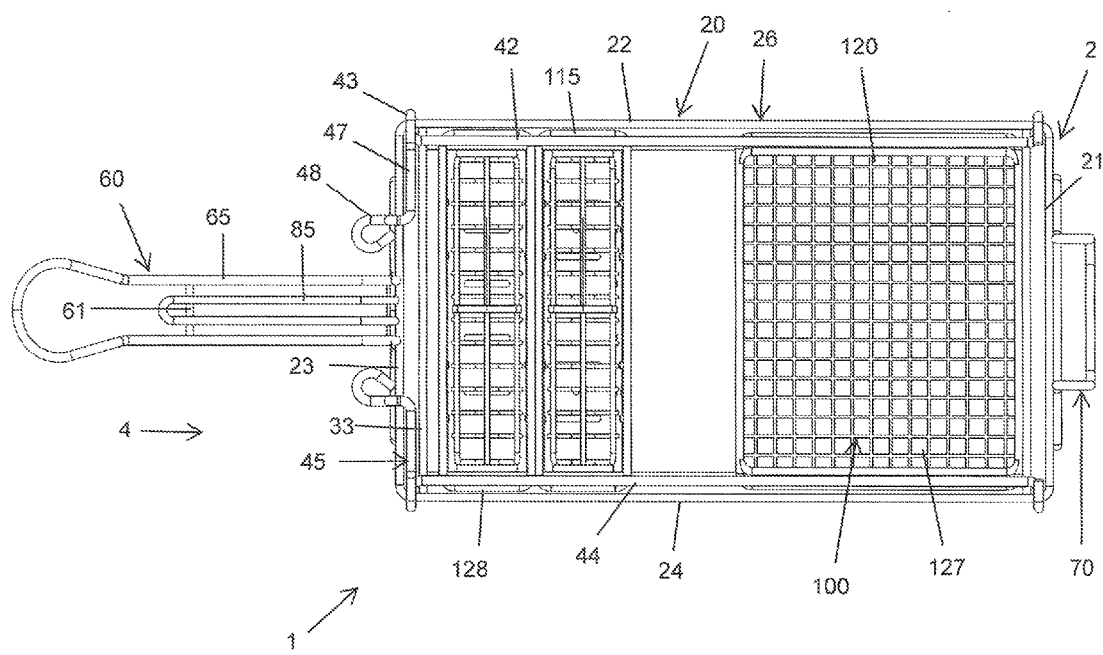
FIG. 3 is a top view of the fry basket body of FIG. 1 holding a larger volume deep frying basket insert and two smaller volume deep frying basket inserts.
Figure 4:
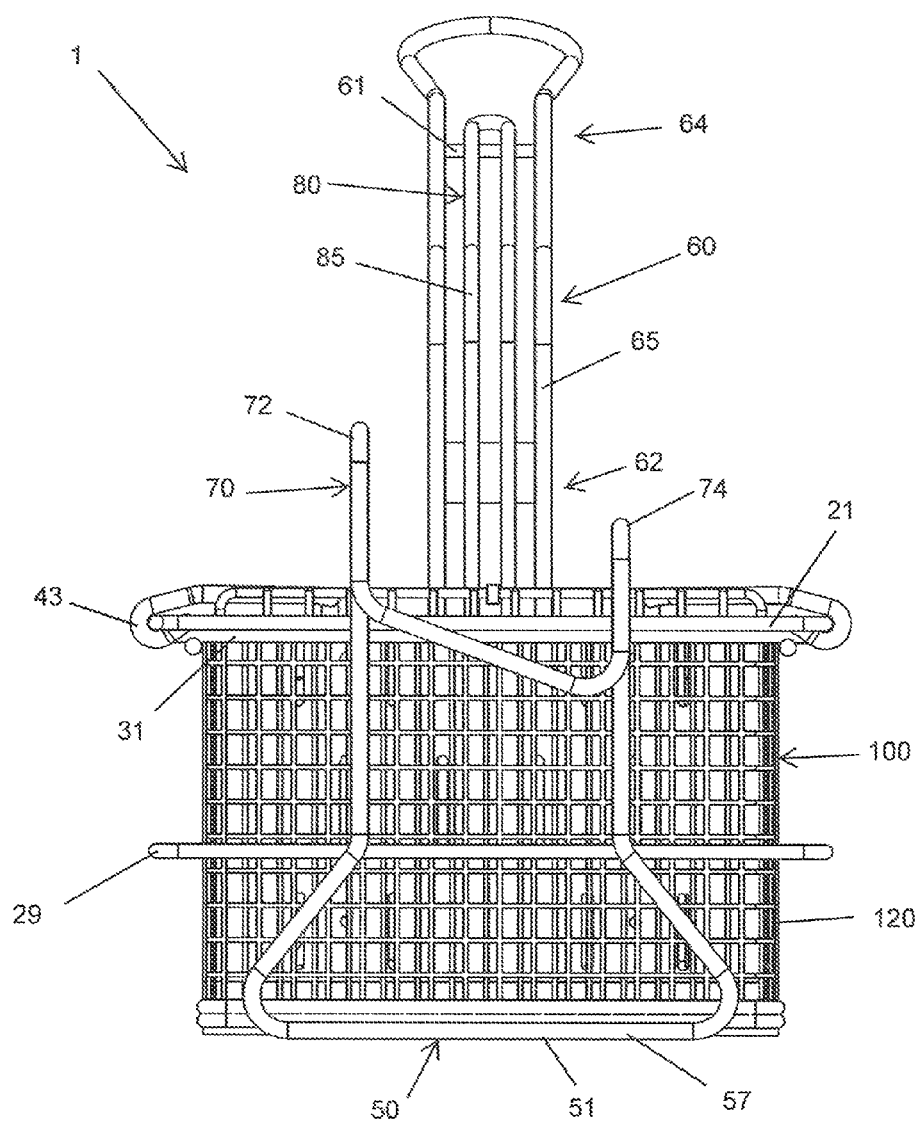
FIG. 4 is a front elevation view of the fry basket of FIG. 1.

In addition, the ability to place and remove inserts in the present fry basket allows the use of a variety of different inserts with the present fry basket, allowing the preparation of different types of food items with the same fry basket. Different food items can be fried together at the same time using the present fry basket, allowing a food preparer to fill an order for such different food items at the same time, in the same frying vat. As shown in FIGS. 1 and 2, for example, the fry basket 1 is configured to retain both taco shell inserts 105 and a deep frying basket insert 120. In this configuration the present fry basket 1 can be used to deep fry two taco shells at the same time as another food item, such as breaded fish or French fries, with the same basket. FIG. 3 illustrates an alternative embodiment, in which a larger deep frying basket insert 127 is used together with two smaller deep frying baskets 128.

A further benefit of the present fry basket 1 is the ability to adjust the cooking environment of items placed in a deep fryer. In FIGS. 1 and 2, two taco shell inserts 105 are retained in the frame 20 and are spaced apart from a larger basket 127. During cooking, this results in differences in the temperature and flow of oil to food items retained in the inserts 100, which in turn results in differences in the resulting cooked food item, including, without limitation, differences in texture and taste. Similarly, in FIG. 3, two smaller deep frying baskets 128 can be spaced apart from a larger deep frying basket 127. Alternatively, inserts 100 can be placed in the frame 20 so as to fill the space within the frame 20.

Other Frame Components

A handle 60 is preferably provided on the rear end 4 of the present fry basket 1. The handle 60 is used to lower the fry basket 1 into a container containing oil or other cooking liquid, such as a fry vat, and to remove the fry basket from the liquid after food items have been cooked. After the fry basket 1 is lifted out of a fry vat, for example, it may be temporarily held or located above or mounted onto a rack above the fry vat in order to let the excess oil drip back into the fry vat. As seen for example in FIG. 4, the handle 60 comprises a proximal end 62 mechanically connected to the frame 20 and distal end 64. In the presently depicted embodiment, the handle 60 is formed from a loop of wire and is welded at its proximal end to the frame 20. In order to strengthen the handle 60, a second, inner loop of wire 80 is also welded to the frame 20 at a proximal end 62 of the handle 60. Cross bracing 61 extending between the lateral rods 65 of handle 60 and the lateral rods 85 of the inner loop 80 is preferably supplied at one or both of the proximal end 62 and/or distal end 64 of the handle 60.

In order to secure the present fry basket 1 to a cooking container or vessel, the front end 2 of the fry basket 1 is preferably provided with a hanger hook 70, for engaging a deep fryer hanger rail during cooking, for example. Hanger 70 can also be used to support rack 40 when rack 40 is suspended above hot cooking oil 12 to permit drainage of hot cooking oil. The hook 70 can be formed in a number of ways known to the art, but in the presently depicted embodiments the hook 70 is formed from an outwardly bent rod. In the depicted embodiment, a first lateral side 72 of the hook 70 is located higher with respect to the horizontal plane of the frame 20 of the present fry basket 1 than a second lateral side 74. When the fry basket is hung from such a hook 70, the body 10 of the fry basket 1 will tilt and allow oil or other liquid to drain.

The present fry basket 1 further comprises legs 50 attached to the frame 20. Legs 50 are used to support the present fry basket 1 on a support surface, such as a counter or the floor of a fry vat. Each of the legs comprises a proximal end (upper end) 52 attached to the body 10 and a distal end (lower end) 54 extending away from the body 10. In the embodiment depicted in FIGS. 1-8, the present fry basket comprises two legs (51 and 53) at the front end 2 and rear end 4 of the fry basket 1, respectively, and each leg 50 is formed from a single piece of wire (contiguous with the hook 70 and handle 60, respectively). In this embodiment each leg comprises two descending leg portions 55 joined by a cross portion 57. Other types of legs or other supports can also be used in the present fry basket 1, however. For example, four legs can be attached to the frame body 20, with one at each corner of a rectangular frame body 20.

Inserts

The present fry basket is designed to incorporate one or more inserts for retaining food items. In one embodiment, the inserts can be generally U-shaped inserts 105 formed from perforated sheet metal attached to a wire frame at an upper end of the insert 100. The inserts 105 form curved receptacles for receiving a food product to be fried, such as a tortilla, in the interior portion 116 of the insert 100 and maintain the food product in a curved position during deep frying, while perforations 118 allow a flow of oil. Each insert is retained within the frame 20 of the present fry basket 1 as described above.

When frying a tortilla in the insert 105, it is preferred that a generally U-shaped or V-shaped insert, such as the wire form 130 (see FIGS. 1, 2, 9, and 10), be placed into the insert 105 after the placement of the tortilla into the insert 105 in order to keep the tortilla from floating to the top of the frying oil, maintain the generally U-shaped form of the tortilla in the insert 105 during frying, and allow a flow of oil through the insert 105. In the embodiment shown in FIGS. 9-10, the V-shaped wire form 130 is made from straight wire which is bent and welded at the ends to form a rectangular or square frame comprising two lateral frame rods 132 and 134. Vertical flanges 135 formed from lengths of wire are disposed between the proximal frame rod 141 and distal frame rod 142 generally parallel to lateral frame rods 132 and 134, and are welded at their ends to the proximal frame rod 141 and distal frame rod 142, respectively. The lateral frame rods 132 and 134 and vertical flanges 135 are bent in a center portion such that the proximal frame rod 141 and distal frame rod 142 are brought into closer proximity, thereby forming the frame into a generally U-shape or V-shape. The proximal frame rod 141 and distal frame rod 142 are connected by an upper horizontal cross bar 136 and together form an upper portion 133 of the wire form 130. At a lower portion 137 of the wire form 130, a lower horizontal cross bar 139 extends across the vertical flanges and between the lateral frame rods 132 and 134 and is welded to the vertical flanges 135 and to lateral frame rods 132 and 134 in order to provide structural strength to the wire form 130. In use, the lower portion 137 of the wire form 130 is lowered into the insert 105 after placement of a tortilla into the insert 105. The use of wire to provide structure to the wire form 130 allows the form to retain its structure but also allow the passage of oil or other cooking liquid through the structure. However, other materials and designs which accomplish this can also be used.

Figure 14:
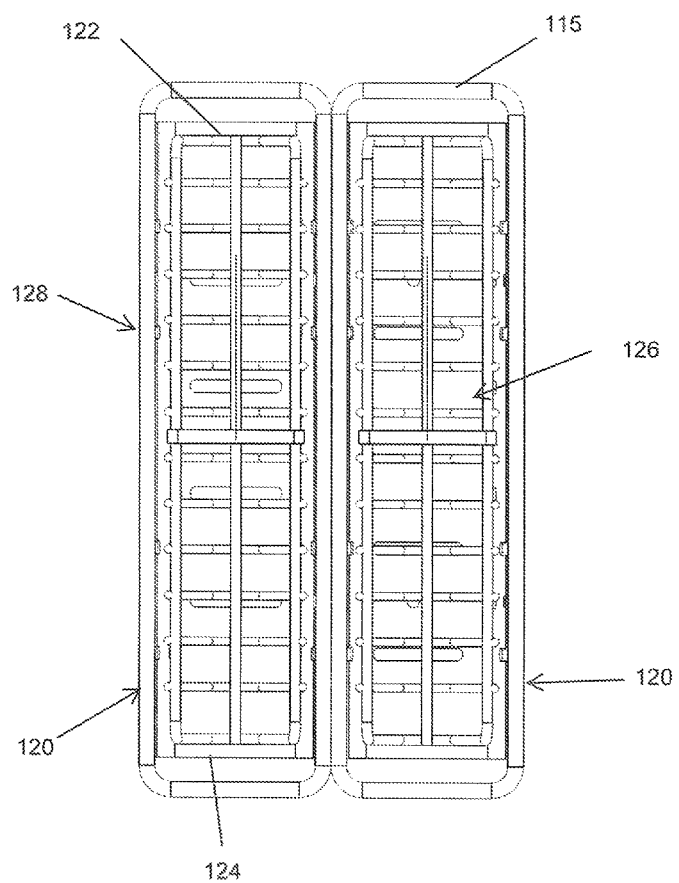
FIG. 14 is a top plan view of the two smaller volume deep frying basket inserts shown in FIG. 3.

Another type of insert 100 that can be used with the present fry basket 1 is a mesh basket 120, constructed of intermeshed wire welded at attachment points, i.e. a wire mesh 129. As shown in FIG. 14, such an insert includes two opposed side walls 122 and 124, two opposed end walls 121 and 123, a bottom 125 and an open top 126. The side walls 122 and 124, end walls 121 and 123, and the bottom 125 are constructed in a wire pattern to form a plurality of openings that are sufficiently large to allow rapid egress and ingress of cooking oil and yet are sufficiently small to prevent predetermined food items from passing through the basket walls. The lateral sides 102 and 104 of the basket 120 are sized to fit between the lateral support rails 30 of the fry basket 1, but the lateral ends of the rim 115 extend laterally beyond the lateral support rails 30 so that the support rails retain the basket 120 within the fry basket 1.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:

1. A basket for immersing food items in a cooking liquid, comprising:
   (a) a frame body, the frame body comprising:
      (i) a circumferential upper support structure formed by a proximal frame rod, a distal frame rod, and a pair of lateral frame rods extending between the proximal frame rod and the distal frame rod, each lateral frame rod comprising a proximal end connected to the proximal frame rod and a distal end connected to the distal frame rod;
      (ii) a pair of lateral support rails connected to the frame body and extending between the proximal frame rod and the distal frame rod at an upper end of the frame body, wherein each of the lateral support rails is disposed below the lateral frame rods; and
      (iii) downwardly extending supports attached to the frame body for supporting the frame above a support surface;
   (b) at least one insert retained by the frame body, the insert being sized to fit between the pair of lateral support rails, the insert comprising an upper end, a lower end, and a pair of lateral sides, each lateral side comprising a laterally extending structural member for supporting the insert within the frame body, the insert comprising openings to allow a flow of cooking liquid therethrough, wherein the insert is configured to retain one or more food items; and
   (c) a pair of locking bars, each locking bar comprising a locking bar rod extending along a lateral side of the frame body between the proximal frame rod and the distal frame rod, each locking bar being hingedly connected with a pair of hinges to a respective lateral frame rod, wherein each locking bar can be rotated with a locking bar handle from an open position to a closed position in which the locking bar rod is positioned over at least the laterally extending structural member of the insert in order to retain the insert within the frame body by rotating the locking bar inwardly, each locking bar rod being located on an opposed lateral side of the frame body, wherein each locking bar handle comprises a laterally extending handle portion and a locking handle portion for rotating a respective locking bar.

2. The basket of claim 1, further comprising a proximal support bar extending between the lateral support rails at a proximal end of each of the lateral support rails and a distal support bar extending between the lateral support rails at a distal end of each of the lateral support rails, wherein the support bars are connected to the lateral support rails and the lateral frame rods.

3. The basket of claim 1, further comprising a handle attached to the frame body, the handle having a distal portion extending vertically above the main frame to allow a user to place the basket into a cooking liquid and remove the basket therefrom.

4. The basket of claim 1, further comprising a rectangular lower support structure formed by four rods.

5. The basket of claim 1, wherein the upper support structure is rectangular.

6. The basket of claim 1, wherein the lateral support rails are linear and disposed parallel to the lateral frame rods.

7. The basket of claim 1, wherein each of the lateral support rails is disposed medially with respect to the lateral frame rods.

8. The basket of claim 1, wherein the support bars are mechanically connected to the undersides of the lateral frame rods.

9. The basket of claim 1, wherein proximal frame rod and the distal frame rod are integrally formed with the pair of lateral frame rods from a single piece of wire in order to form the circumferential upper support structure.

10. The basket of claim 1, wherein when the locking bar can be rotated in the open position so that the locking bar rod is disposed beneath the lateral frame rods.

11. The basket of claim 1, wherein the frame body is formed from rigid metal wire.

12. The basket of claim 1, wherein the insert is formed from a wire mesh.

13. The basket of claim 1, wherein the laterally extending structural member of the insert is a rim.

14. The basket of claim 1, wherein the insert comprises a perforated U-shaped sheet of metal attached at an upper end to the laterally extending structural member.

15. The basket of claim 1, wherein the cooking liquid is oil.

16. The basket of claim 1, wherein the basket comprises a plurality of inserts.

* * * * *